United States Patent [19]
Reinecke et al.

[11] 3,888,550
[45] June 10, 1975

[54] ANTI-WHEEL SKID CONTROL SYSTEM PROVIDING CONTROLLED REAPPLICATION OF BRAKE PRESSURE

[75] Inventors: Erich Reinecke, Beihorn, Burg; Fritz Isernhagen, Letter; Alfred Klatt, Ronnenberg; Lutz Weise, Misburg; Wilhelm Schlamann, Altwarmbuchen; Klaus Lindemann, Hannover, all of Germany

[73] Assignee: Westinghouse Bremsen-und Apparatebau GmbH, Hannover, Germany

[22] Filed: Oct. 10, 1973

[21] Appl. No.: 404,849

[30] Foreign Application Priority Data
Feb. 5, 1973 Germany............................ 2305589
Feb. 15, 1973 Germany............................ 2307368

[52] U.S. Cl. ................................. 303/21 P; 303/20
[51] Int. Cl.................................................. B60t 8/12
[58] Field of Search............ 188/181 C; 303/20, 21; 317/5; 324/161; 340/53, 62, 263

[56] References Cited
UNITED STATES PATENTS

| | | | |
|---|---|---|---|
| 3,635,530 | 1/1972 | Packer et al. | 303/21 P |
| 3,637,264 | 1/1972 | Leiber et al. | 303/21 BE |
| 3,734,573 | 5/1973 | Davis et al. | 303/21 BE X |
| 3,782,783 | 1/1974 | Jones | 303/20 X |
| 3,790,227 | 1/1974 | Dozier | 303/21 P X |
| 3,833,270 | 9/1974 | Gotz et al. | 303/21 BE |

*Primary Examiner*—Trygve M. Blix
*Assistant Examiner*—Stephen G. Kunin
*Attorney, Agent, or Firm*—R. W. McIntire, Jr.

[57] ABSTRACT

An anti-wheel skid brake control system for controlling modulating valve device means associated with an individual wheel during the reapplication of brake pressure following correction of a wheel skid. Depending upon the nature of the reapplication brake pressure curve, the modulating valve device is operable in a normal mode for either a predetermined time duration (progressively increasing pressure curve) or for a time duration which varies dependent upon the brake pressure at the time of reapplication (substantially linear reapplication curve) so that in either case the reapplication pressure is greater at higher brake pressures than lower brake pressures and accordingly counteracts the braking hysteresis which also increases with higher braking pressures. Following expiration of the time period, the modulating valve is operated in an intermittent mode to allow the reapplication brake pressure to taper off and accordingly obtain increased stability as the reapplication brake pressure approaches normal brake pressure.

4 Claims, 4 Drawing Figures

3,888,550

1

ANTI-WHEEL SKID CONTROL SYSTEM PROVIDING CONTROLLED REAPPLICATION OF BRAKE PRESSURE

BACKGROUND OF THE INVENTION

In order to achieve more efficient braking on vehicles equipped with wheel anti-skid control systems, it is proposed that the actual braking pressure be closely correlated with an ideal braking pressure curve, which usually lies below the maximum braking pressure curve. It is axiomatic therefore that substantial overshooting of the ideal braking pressure curve must be avoided in order to prevent excessive cycling of the brakes which would preclude attainment of the ideal braking pressure curve.

By regulating the rate of reapplication of braking pressure following a wheel skid control operation so as to exhibit a relatively shallow pressure gradient, substantial overshooting and thus cycling of the brakes can be avoided, but the total brake operation becomes unsatisfactory due primarily to the hysteresis between the braking torque developed and the brake cylinder pressure producing the braking torque. This hysteresis is greatest in the higher pressure ranges, becoming progressively reduced in the lower pressure ranges. Since the brake pressure must pass through this hysteresis range before any response of the brake is realized, regulating the rate of brake reapplication pressure so that a shallow pressure gradient is produced to avoid overshooting the ideal braking pressure curve, as above mentioned, results in extremely slow response times, especially in the higher brake pressure ranges where the brake hysteresis is greatest.

It has been previously proposed to establish a rather steep reapplication pressure gradient initially and then to gradually taper off the pressure gradient so as to bring the actual brake pressure into conformance with the ideal braking pressure curve smoothly by means of a regulating valve device. The design complexity of this regulating valve device, however, makes it expensive to produce and to maintain and in addition makes the valve subject to malfunction.

SUMMARY OF THE INVENTION

It is accordingly the main object of this invention to provide an anti-skid brake control system which reduces the harmful effect of the braking hysteresis, while allowing the actual braking pressure to follow the ideal braking pressure curve without causing any significant overshooting.

Another object of the invention is to provide an anti-skid control system that is characterized by a low degree of complexity in its construction and is operationally reliable.

These objects are fulfilled, according to the invention, by providing the brake control system with timing means activated simultaneously with a solenoid valve controlling the reapplication of braking pressure, the duration of which is determined by the timing means. Following expiration of the timing period, means is provided to effect pulse control of the solenoid valve in order to obtain a slower rate of reapplication pressure as the actual braking pressure approaches the ideal braking pressure.

In a first embodiment of the invention, the timing means produces in predetermined constant timing period which, in the face of a non-linear brake pressure buildup curve that provides increasing rates of brake pressure increases with higher effective braking pressures, results in the degree of brake pressure increase during the timing period being greater for higher effective braking pressure than for lower braking pressures, thereby counteracting the braking hysteresis hereinbefore mentioned.

In a second embodiment of the invention, the timing means establishes two different timing periods, the longer being effective in response to closure of a pressure switch when the effective brake pressure at the time of a brake reapplication is above a predetermined level and the shorter period resulting from a brake pressure below a predetermined level. This provides, in the case of a linear brake pressure buildup curve, a pressure increase during the timing period that is greater for higher effective brake pressures than for lower effective brake pressures, thereby counteracting the braking hysteresis.

A third embodiment of the invention also provides for two different timing periods, selection of which is predicated on the duration of wheel skid and thus the degree of reduction of brake pressure that takes place. Since the duration of the brake pressure reduction determines the effective brake pressure at the time a reapplication is called for, this arrangement is similar in concept to the second embodiment, being effective to counteract the braking hysteresis in the instance where the brake pressure buildup curve follows a linear path.

Other objects and advantages of the invention will be realized from the following more detailed description of the invention when considered with the accompanying drawings in which.

DESCRIPTION AND OPERATION

Figure 1:
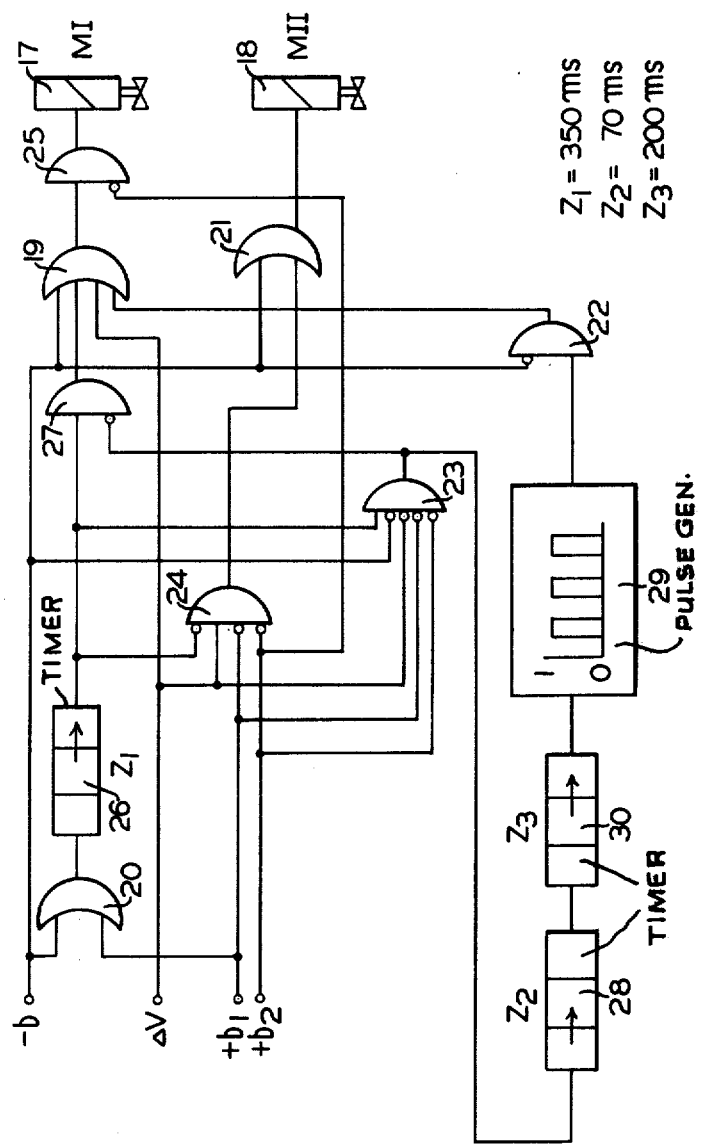
FIG. 1 shows an anti-skid control system for controlling a pair of solenoid valves arranged to supply and release brake pressure in a manner to counteract the braking hysteresis yet avoid overshooting the ideal brake pressure.

Referring to FIG. 1, input signals $-b$, $\Delta V$, $+b_1$, and $+b_2$ are obtained via signal generating means, not shown, and fed to the electronic logic control device shown. The $-b$ signal occurs in response to a vehicle wheel decelerating at a rate in excess of a predetermined threshold selected as the deceleration level likely to induce a wheel skid. The $\Delta V$ signal is generated when the wheel velocity becomes a predetermined amount less than a reference velocity $V_{ref}$ shown associated with the velocity curve that appears in the upper portion of FIG. 2. The $+b_1$ signal is generated when the wheel velocity reaches a certain acceleration rate indicative of the wheel skid having been corrected.

The $-b$ signal is connected directly to one input of an OR gate 19, an OR gate 20, an OR gate 21 and to an inverted input of an AND gate 22 and an AND gate 23.

The $\Delta V$ signal is fed directly to another input of the OR gate 19 and the input of an AND gate 24, as well as to an inverted input of AND gate 23.

The $+b_1$ signal is connected directly to another input of the OR gate 20, as well as to another inverted input of the AND gates 23 and 24. The $+b_2$ signal is also transmitted to another inverted input of the AND gates 23 and 24, as well as to an inverted input of AND gate 25, the other input of which is connected to the output of OR gate 19.

The signal emitted by OR gate 20 is transmitted to a release lag timing circuit 26, whose output signal is fed to an input of an AND gate 27 and AND gate 23, as well as to another inverted input of AND gate 24.

Figure 2:
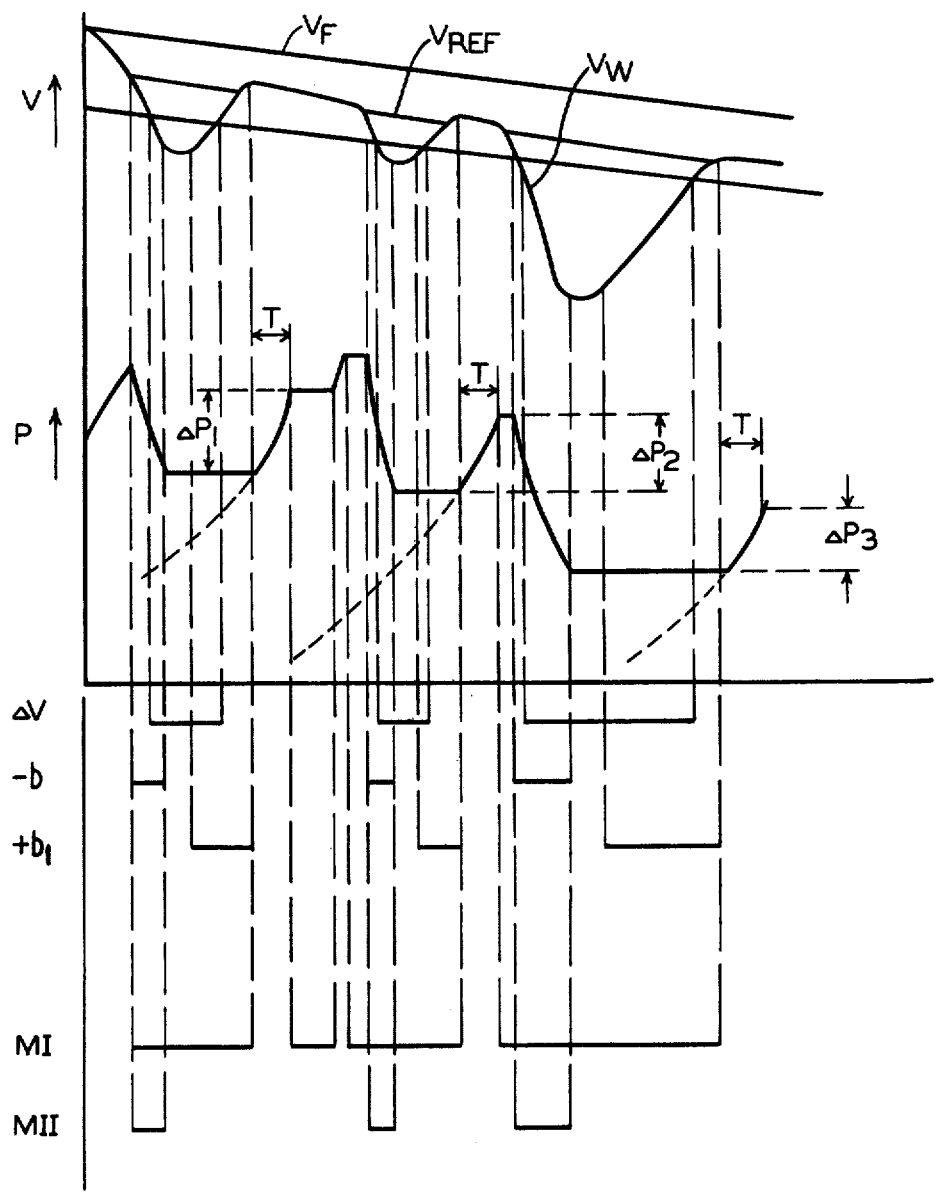
FIG. 2 shows a graph illustrating the operation of the control system of FIG. 1.

The output signal emitted by AND gate 23 is transmitted simultaneously to the inverted second input of AND gate 27 and to a slow operating timing circuit 28, which produces a constant timing period during which the reapplication of braking pressure is developed in accordance with the pressure curve shown in the diagram in the center portion of FIG. 2. The output signal of the slow operating timing circuit 28 is fed via a release lag timing circuit 30 to a conventional pulse generator 29, whose pulse signals are transmitted to the second input of AND gate 22.

The output signal of AND gate 24 is transmitted to the second input of OR gate 21 whose output signals control energization of the solenoid valve 18 of an electro-pneumatic valve MII interposed in the delivery line of a brake cylinder device, not shown. In the energized state of solenoid 18, valve MII is actuated to a position connecting the brake cylinder device to atmosphere, and in the deenergized state, is actuated to a position interrupting this connection.

The output signal of the AND gates 22 and 27 are each connected to inputs of OR gate 19. The signal emitted by OR gate 19 is transmitted to the second input of AND gate 25 whose output signals control energization of solenoid 17 of an electro-pneumatic valve MI that controls the supply of fluid pressure to the brake cylinder. In the energized state, solenoid valve 17 causes actuation of supply valve MI to interrupt the supply of fluid pressure to the brake cylinder device and when deenergized, causes valve MI to supply fluid pressure to the brake cylinder.

The manner of operation of a first embodiment of the invention, as above described, is illustrated now with reference to the diagram shown in FIG. 2.

Following initiation of a brake application, the $-b$ signal appears when the wheel decelerataion exceeds a certain threshold value selected. If the wheel velocity falls below a certain wheel velocity threshold, the $\Delta V$ signal appears concurrently with the $-b$ signal present. The $-b$ signal acts via OR gate 19 and AND gate 25 to energize solenoid 17 of valve MI, which accordingly interrupts the connection between the wheel brake cylinder and the source of fluid pressure, and via OR gate 21 to energize solenoid 18 of valve MII, which accordingly establishes communication between the wheel brake cylinder and atmosphere. The pressure in the wheel brake cylinder is thus released until the wheel deceleration again falls below the selected deceleration threshold and the $-b$ signal vanishes, in response to which solenoid 18 is deenergized and valve MII terminates any further reduction of brake cylinder pressure.

The inlet solenoid of valve MI, however, continues to be excited due to presence of the $\Delta V$ signal acting via OR gate 19 and AND gate 25 to hold valve MI in its closed position. Now with both valves MI and MII closed, the brake cylinder pressure is held constant, while the wheel continues to turn in this holding phase. If the wheel acceleration subsequently exceeds a certain threshold value indicative of the wheel skid being corrected, the $+i\ b_1$ signal appears concurrent with the $\Delta V$ signal, which keeps solenoid 18 of valve MI excited after the loss of the $\Delta V$ signal, as the wheel velocity threshold is exceeded. The $+b_1$ signal acts via the OR gate 20, the release lag timing circuit 26, AND member 27, OR gate 19, and AND gate 25, at this time to maintain solenoid 18 energized in the absence of the $\Delta V$ signal.

If the wheel acceleration falls below the acceleration threshold, the $+b_1$ signal vanishes. The timing circuit 26, however, maintains its output signal at the one input of AND gate 27 over a time sufficient for the following regulating process to take place. Since no $+b_1$ signal arises at the correspondingly inverted input of AND gate 23, the AND gate 23 is enabled and transmits a signal to the inverted input of AND gate 27, which accordingly becomes diabled. The signal emitted by AND gate 23 also excites timing circuit 28. Until the short lag time determined by this slow operation timing circuit 28 has lapsed, there is no signal presented to AND gate 22 via pulse generator 29. Accordingly all inputs at OR gate 19 are absent so that AND gate 25 is disabled and solenoid 17 of valve MI is deenergized. Since solenoid 18 of valve MII is also deenergized, valves MI and MII are positioned to establish the buildup of fluid brake pressure. This reapplication of braking pressure displays a progressively increasing pressure characteristic due to the braking pressure modulating valve shown and fully described in U.S. Pat. application, Ser. No. 310,681, now U.S. Pat. No. 3,837,710, which although not shown, is connected in series with valve MI.

After the time lag establishing timing period T has passed, the slow operating timing circuit 28 transmits an output signal to a release lag timing circuit 30 the output of which drives pulse generator 29, which acts through AND gate 22, OR gate 19, and AND gate 25 to energize solenoid 17 of valve MI to terminate the continuous reapplication of brake pressure and initiate a pulsed phase of reapplication brake pressure. In this pulsed phase, AND gate 22 is periodically disabled and enabled to respectively open and close supply valve MI so that the braking pressure builds up with a smooth slope and the wheel velocity curve $V_R$ progresses along the theoretical reference velocity curve $V_{ref}$ representing the best possible utilization of braking force. A new regulating process begins upon the appearance of the next $-b$ signal.

During the time lag defined by T in FIG. 2, which remains constant in each regulating cycle and is determined in accordance with the fixed setting of slow operation timing circuit 28, a variable pressure change $\Delta p$ occurs depending upon the braking pressure present at the time of reapplication. In the lower pressure range, $\Delta p$ is smaller since the progressively increasing characteristic of the reapplication pressure follows a curve which is relatively flat in the lower pressure region. In the upper pressure range, $\Delta p$ is larger since the progressively variable pressure curve exhibits a relatively steep slope here. Thus, the variable nature of $\Delta p$ through the different reapplication pressure ranges acts to counteract the braking hysteresis which increases with increasing brake pressures.

Figure 3:
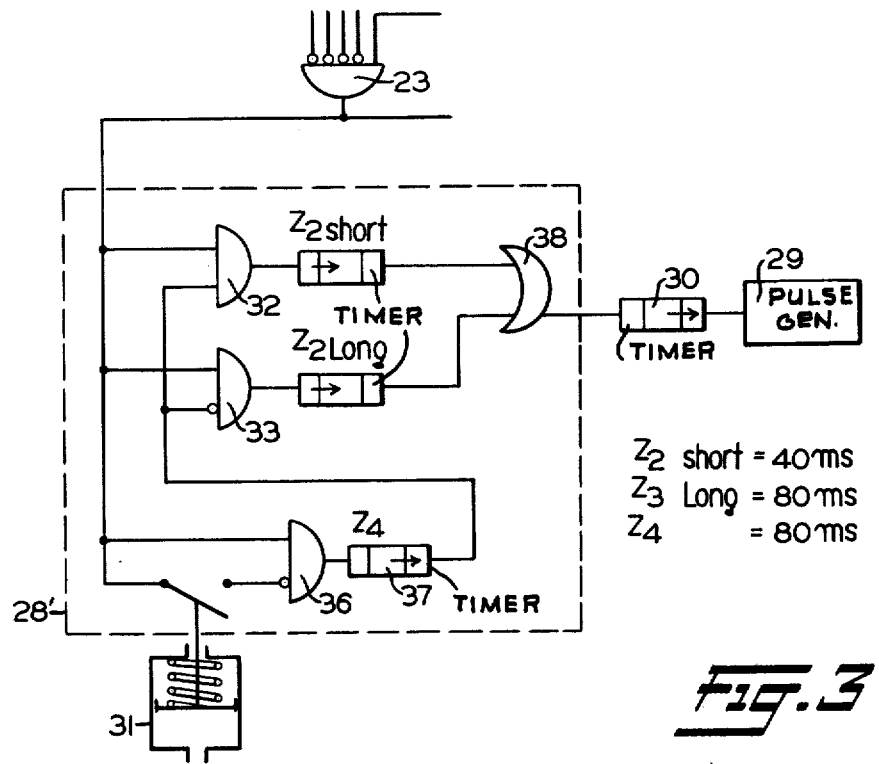
FIGS. 3 and 4 shows variations in the timing means and control therefor in order to counteract brake hysteresis where a linear brake pressure buildup curve is employed as opposed to the non-linear buildup curve of FIG. 1.

The embodiment of the invention shown in FIG. 3 may be utilized where a linear rather than a progressively variable reapplication brake pressure occurs. Slow operating timing circuit 28', which is the counterpart of circuit 28 of FIG. 1, exhibits both a short and a long timing function. Selection of the appropriate one of these timing functions is predicated on the braking pressure at the time of reapplication, as dictated by a brake pressure activated switch 31 located in the conductor leading to one input of an AND gate 36 that is serially connected to a release lag timing circuit 37. A short duration timing circuit 34 is driven by an AND gate 32 and a long duration timing circuit 35 is driven by an AND gate 33. The output of release lag timing circuit 37 is connected to one input of AND gate 32 and to an inverted input of AND gate 33. The other input of AND gates 32 and 33 as well as both inputs of AND gate 36 are supplied by the output of AND gate 23. An OR gate 38 whose inputs are supplied by the respective short and long duration timing circuits 34 and 35 provides the output of slow operating timing circuit 28' to drive pulse generator 29 via release lag timing circuit 30.

When the $+b_1$ signal effective at the corresponding inverted input of AND gate 23 vanishes due to the wheel acceleration becoming less than the predetermined acceleration threshold, AND gate 23 is enabled to provide an output, as in the first embodiment. This signal emitted by AND gate 23 is fed to each of the AND gates 32 and 33, but is cut off from the inverted input of ANG gate 36 by pressure switch 31, which is assumed to be subject to low brake pressure, so that AND gate 36 is enabled. Accordingly, timing circuit 37 is activated, presenting a signal at the inverted input of AND gate 33, which is thereby disabled, and presenting a signal at AND gate 32, which is enabled. Thus, the long duration timing circuit is deactivated and the short duration timing circuit is activated, during which period no signal is provided at OR gate 38. Therefore, pulse generator 29 remains inactive and the reapplication pressure is able to develop normally.

When this short duration delay period expires, a signal is presented to OR gate 38 to activate timing circuit 30 and in turn cause pulse generator 29 to be activated, as in the first embodiment, in order to obtain the pulsed buildup phase of the reapplication pressure.

If the brake pressure at the time the $+b_1$ signal vanishes is sufficient to effect closure of pressure switch 31, a signal will then be presented to the inverted input of AND gate 36, which accordingly becomes disabled. This results in the long duration timing circuit 35 being activated and short duration timing circuit 34 becoming deactivated to extend the period during which normal buildup of reapplication brake pressure occurs and the subsequent pulsed phasea of pressure buildup is withheld.

It is apparent from the above that several pressure switches having different closing pressures may be employed for the purpose of obtaining several additional delay periods of varying duration. The varying delay periods provided in this second embodiment of the invention assure that when a linear reapplication pressure is employed, the change in pressure $\Delta p$ will vary accordingly and thus counteract the braking hysteresis.

Figure 4:
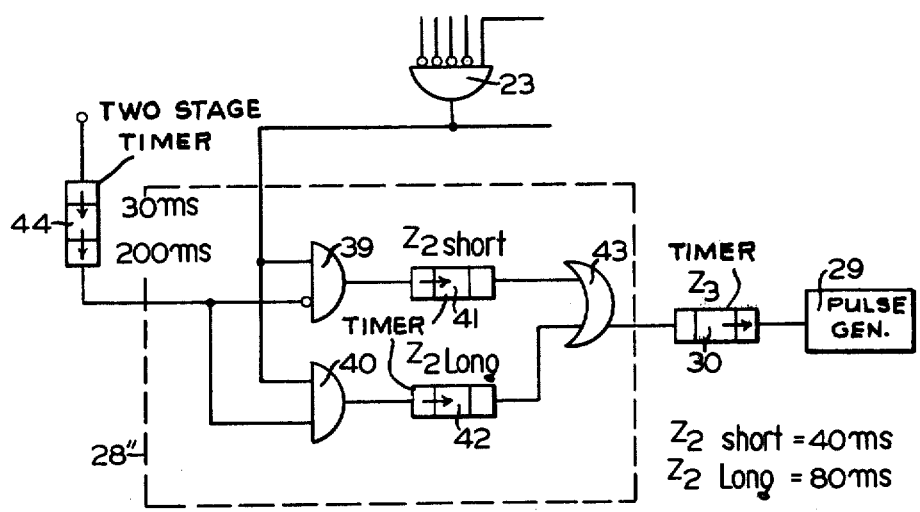

FIG. 4 shows another embodiment of the invention in which a slow operating timing circuit 28'' is employed in place of circuit 28 of FIG. 1. Again, a short and a long timing function is provided, appropriate selection of which is automatically obtained in accordance with the duration the $-b$ signal is present, as an indication of the degree of brake pressure release required to control a skidding wheel.

Circuit 28'' consists of a short duration timing circuit 41 and a long duration timing circuit 42, which control pulse generator 29 via OR gate 43 and release lag timing circuit 30, and a pair of AND gates 39 and 40 whose respective outputs drive circuits 41 and 42. A first input of each AND gate 39 and 40 is supplied by the output of AND gate 23, while the output of a two-stage timing circuit 44 is connected to the inverted second input of AND gate 39 and to the second input of AND gate 40.

Now if the $-b$ signal at the input of circuit 44 is present for a duration less than the time period comprising the first stage of circuit 44, there will be no output signal therefrom. This will cause AND gate 39 to activate short duration timing circuit 41 at the time AND gate 23 becomes enabled, while long duration timing circuit 42 remains deactivated by reason of AND gate 40 being disabled. If the $-b$ signal is present for a duration exceeding the first stage time period, circuit 41 will subsequently present an output signal which will in turn activate the long duration timing circuit via AND gate 40 when AND gate 23 is subsequently enabled. Depending upon which timing circuit is activated, the reapplication brake pressure will buildup normally for varying time durations prior to the pulsed phase of pressure buildup becoming effective. The change in reapplication pressure $\Delta p$ will thus counteract the effective braking hysteresis, even to the extent of the brake hysteresis varying for a particular pressure due, for example, to increased wear on older vehicles, as this is automatically accounted for by the duration of the $-b$ signal upon which circuit 28'' relies for control.

Having now described the invention, what we claim as new and desire to Secure by Letters Patent is:

1. For use in a vehicle having an anti-skid brake control system of the fluid pressure type employing signaling means for monitoring and evaluating the behavior of a wheel of said vehicle, and an electronic logic control device responsive to the signaling means, said electronic logic control device comprising:

a. control valve means for modulating fluid brake pressure delivered to a corresponding wheel of said vehicle;

b. control circuit means for operating said control valve means responsive to a first signal emitted by said signaling means when recovery of a skidding wheel is sensed following correction thereof so as to effect the reapplication of fluid brake pressure thereto;

c. pulse generator means for periodically interrupting said reapplication of fluid brake pressure; and d. timing means activated responsive to said first signal for providing a time period during which operation of said pulse generator means is delayed to permit the reapplication of brake pressure to follow a reapplication brake pressure build-up curve having a predetermined brake pressure versus time characteristic such that during said time period, a greater degree of brake pressure reapplication occurs when the brake pressure is reapplied from a higher existing brake pressure than from a lower existing brake pressure.

2. The system as recited in claim 1, further characterized in that said timing period is constant and said predetermined brake pressure buildup curve exhibits a progressively increasing characteristic so that the change in said fluid brake pressure during said time period is greater when said fluid brake pressure is reapplied from a higher existing brake pressure than a lower existing brake pressure.

3. The system as recited in claim 1, further characterized in that said brake pressure buildup curve is substantially linear and said time period is at least one of two different time periods selected in accordance with the existing brake pressure being greater than or less than a predetermined level so that the change in said fluid brake pressure is greater when said fluid brake pressure is reapplied from a level above said predetermined level than when reapplied from a level below said predetermined level.

4. The system as recited in claim 1, further comprising:
   a. delay means for providing an output signal dependent upon the duration of a second signal emitted by said signaling means during the period said brake pressure is being reduced incident to said wheel decelerating in excess of a predetermined threshold;
   b. said brake pressure buildup curve being substantially linear; and
   c. said time period being one of at least two different time periods selected in accordance with said output signal whereby said change in said fluid brake pressure is greater when said fluid brake pressure is reapplied from a higher existing brake pressure than a lower existing brake pressure.

* * * * *